United States Patent
Harris et al.

(10) Patent No.: US 9,758,118 B2
(45) Date of Patent: Sep. 12, 2017

(54) BUMPERS INCLUDING ENERGY DIVERTING BUMPER STRUCTURES AND VEHICLES INCORPORATING THE SAME

(71) Applicant: Toyota Motor Engineering & Manufacturing North America, Inc., Erlanger, KY (US)

(72) Inventors: Ryan Craig Harris, Saline, MI (US); Edgardo Reyes-Crespo, Ypsilanti, MI (US); Scott L. Frederick, Brighton, MI (US)

(73) Assignee: Toyota Motor Engineering & Manufacturing North America, Inc., Erlanger ( * ) Notice: Subject to any disclaimer, the term of this patent is extended or adjusted under 35 U.S.C. 154(b) by 84 days.

(21) Appl. No.: 14/554,089

(22) Filed: Nov. 26, 2014

(65) Prior Publication Data

US 2016/0144815 A1 May 26, 2016

(51) Int. Cl.
| | |
|---|---|
| *B60R 19/44* | (2006.01) |
| *B60R 19/24* | (2006.01) |
| *B60R 19/22* | (2006.01) |
| *B60R 19/34* | (2006.01) |
| *B60R 19/18* | (2006.01) |

(52) U.S. Cl.
CPC .............. *B60R 19/34* (2013.01); *B60R 19/18* (2013.01); *B60R 2019/1866* (2013.01)

(58) Field of Classification Search
CPC .............. B60R 19/18; B60R 2019/186; B60R 2019/1866; B60R 2019/188; B60R 19/04; B60R 19/34; B29C 44/08; E04C 2003/0456; F16F 7/121

USPC .............. 293/120, 133, 132, 155, 102, 117; 296/187.09, 187.02
See application file for complete search history.

(56) References Cited

U.S. PATENT DOCUMENTS

| | | | | |
|---|---|---|---|---|
| 3,495,676 | A * | 2/1970 | Graham .................. | B60R 19/26 180/276 |
| 4,941,701 | A * | 7/1990 | Loren ..................... | B60R 19/18 293/109 |
| 4,998,761 | A * | 3/1991 | Bayer ..................... | B60R 19/18 293/121 |
| 5,219,197 | A * | 6/1993 | Rich ....................... | B60R 19/18 293/120 |
| 6,672,635 | B2 | 1/2004 | Weissenborn et al. | |
| 6,695,366 | B2 | 2/2004 | Cherry | |
| 6,764,118 | B2 | 7/2004 | DePottey et al. | |
| 6,857,690 | B2 | 2/2005 | Vismara et al. | |
| 6,938,936 | B2 | 9/2005 | Mooijman | |

(Continued)

OTHER PUBLICATIONS http://www.mscsoftware.com/de/resources-customer-case-studies/msc-software-professional-services-team-enables-development-patented, Energy Absorbing Bus Bumper System, undated.

*Primary Examiner* — Glenn Dayoan
*Assistant Examiner* — Sunsurraye Westbrook
(74) *Attorney, Agent, or Firm* — Dinsmore & Shohl LLP

(57) ABSTRACT

A bumper includes a bumper beam assembly including a bumper reinforcement beam having a bumper central portion and bumper extension portions at outboard ends of the bumper reinforcement beam. A reinforcement bracket is positioned on a front side of the bumper beam assembly at an outboard end of the bumper beam assembly. An energy diverting bumper structure is positioned on a front side of the reinforcement bracket.

20 Claims, 7 Drawing Sheets

(56) References Cited

U.S. PATENT DOCUMENTS

| | | |
|---|---|---|
| 7,044,516 B2 * | 5/2006 | Kobayashi ............... B60R 19/24 |
| | | 293/122 |
| 7,147,258 B2 | 12/2006 | Evans et al. |
| 7,275,775 B2 | 10/2007 | Park et al. |
| 7,556,297 B2 | 7/2009 | Ohno et al. |
| 7,954,865 B2 | 6/2011 | Schwarz et al. |
| 7,980,606 B2 | 7/2011 | Takahashi et al. |
| 8,136,855 B2 | 3/2012 | Toneatti et al. |
| 8,152,211 B2 | 4/2012 | Klimek |
| 2008/0023972 A1 * | 1/2008 | Ohno ..................... B60R 19/18 |
| | | 293/155 |
| 2012/0104775 A1 * | 5/2012 | Marur ..................... B60R 19/18 |
| | | 293/120 |

* cited by examiner

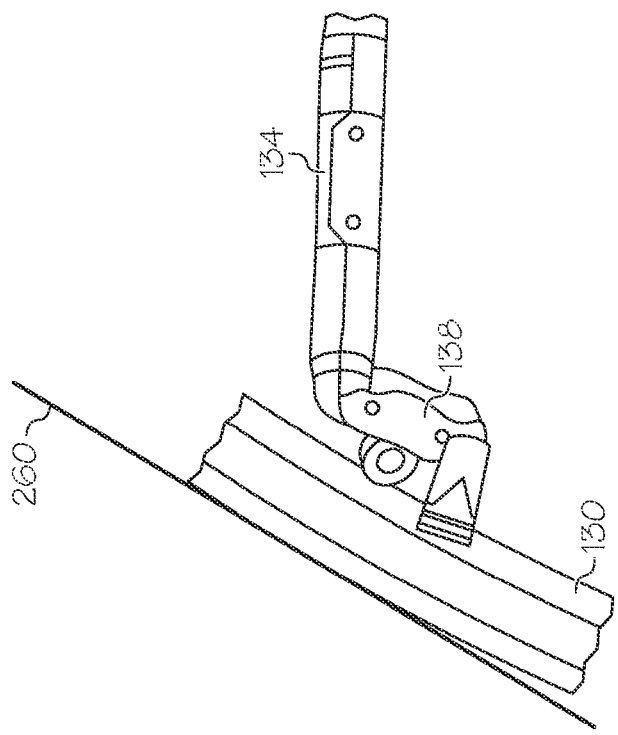
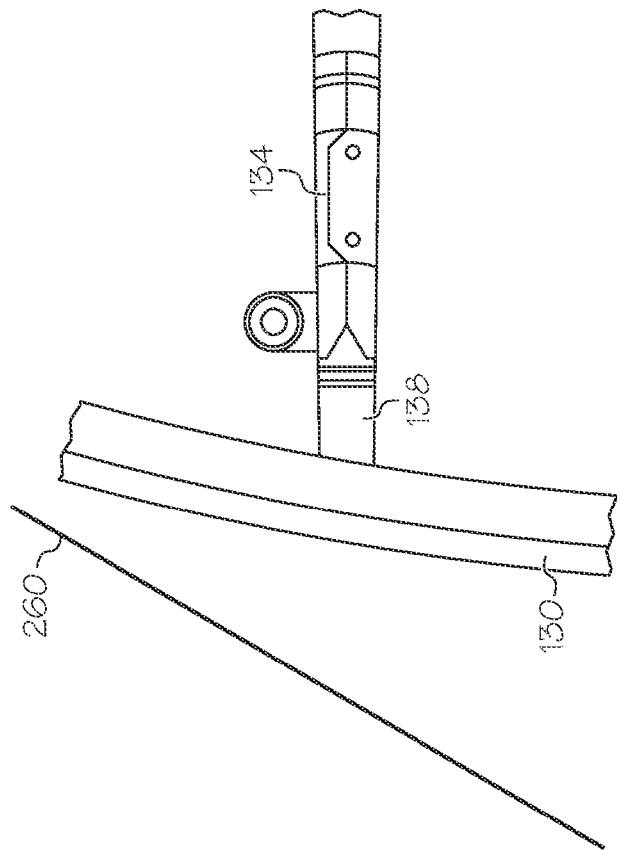
FIG. 7A
FIG. 7B

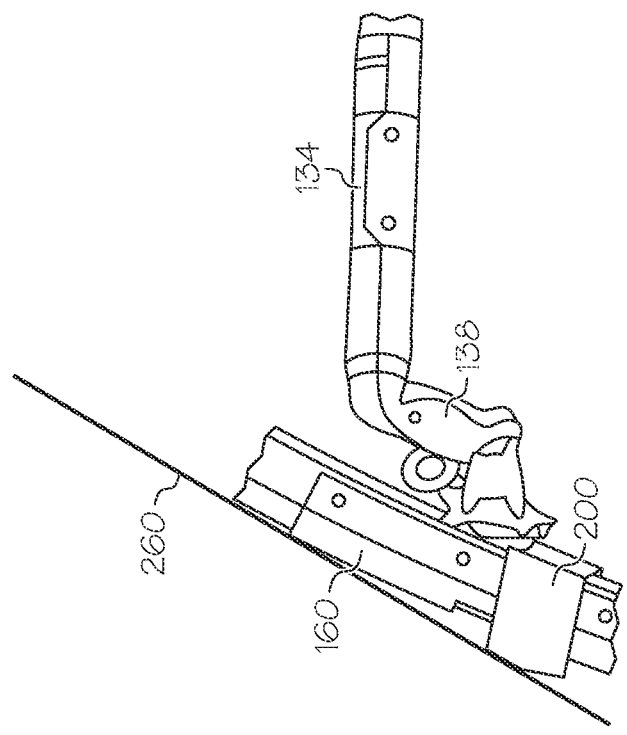
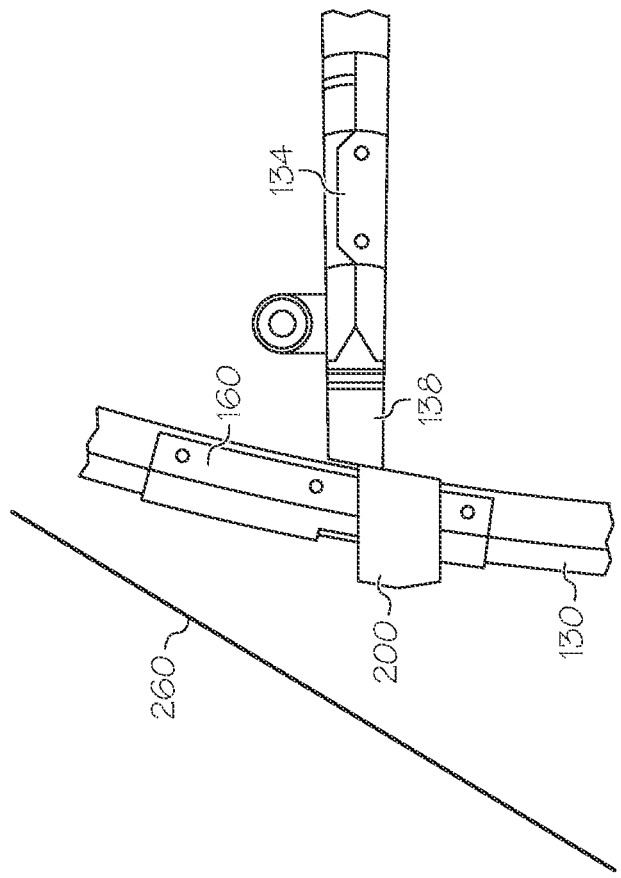
FIG. 9B
FIG. 9A

BUMPERS INCLUDING ENERGY DIVERTING BUMPER STRUCTURES AND VEHICLES INCORPORATING THE SAME

TECHNICAL FIELD

The present specification generally relates to bumpers and vehicles that include bumpers, and more specifically, bumpers that include energy diverting bumper structures.

BACKGROUND

Vehicles may be equipped with bumper systems and impact protection structures that elastically and plastically deform to absorb energy in the event of an impact. A number of standards and tests currently exist. For example, the National Highway Traffic Safety Administration has a legislative mandate under Title 49 of the United States Code, Chapter 301, Motor Vehicle Safety, to issue Federal Motor Vehicle Safety Standards (FMVSS) and Regulations to which manufacturers of motor vehicle and equipment items must conform and certify compliance. Another test, the small overlap test, such as conducted by Insurance Institute for Highway Safety (IIHS), replicates what happens when the front corner impacts an object.

While current countermeasures are being used to satisfy a variety of tests and standards, one countermeasure used to satisfy a particular test may affect the vehicle's performance in a different test area, for example, by redirecting a load path during a particular impact test. Accordingly, a need exists for energy diverting structures that can alter or redirect load paths in order to satisfy over a number of different standards.

SUMMARY

In one embodiment, a bumper includes a bumper beam assembly including a bumper reinforcement beam having a bumper central portion and bumper extension portions at outboard ends of the bumper reinforcement beam. A reinforcement bracket is positioned on a front side of the bumper beam assembly at an outboard end of the bumper beam assembly. An energy diverting bumper structure is positioned on a front side of the reinforcement bracket.

In another embodiment, a vehicle includes a side support that extends in a vehicle longitudinal direction. A bumper beam assembly includes a bumper reinforcement beam that is coupled to the side support. The bumper reinforcement beam extends in a vehicle lateral direction that is transverse to the vehicle longitudinal direction. The bumper reinforcement beam includes a front side that is oriented to face forward in the vehicle longitudinal direction. A reinforcement bracket is positioned on a front side of the bumper beam assembly at an outboard end of the bumper reinforcement beam. An energy diverting bumper structure is positioned on a front side of the reinforcement bracket.

In another embodiment, a method of altering a vehicle load path for a 30 degree rigid barrier test in accordance with Federal Motor Vehicle Safety Standards (FMVSS) 208 is provided. The method includes providing a bumper reinforcement beam connected to a side support that extends in a vehicle longitudinal direction. The bumper reinforcement beam provides a baseline load path for the 30 degree rigid barrier test. A reinforcement bracket is connected to a front side of the bumper reinforcement beam at an outboard end of the bumper reinforcement beam. The reinforcement bracket moves the load path outboard of the baseline load path. An energy diverting bumper structure is connected to the bumper reinforcement beam thereby moving the load path provided by the reinforcement bracket inboard toward the baseline load path.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIGS. 7A-9B illustrate operation of the energy diverting bumper structure of FIG. 2.

DETAILED DESCRIPTION

Vehicles according to the present specification include a bumper beam assembly that includes a bumper reinforcement beam, where the bumper reinforcement beam extends in a vehicle lateral direction, and a front side of the bumper reinforcement beam is oriented to face forward in a vehicle longitudinal direction. A reinforcement bracket is coupled to the front side of the bumper reinforcement beam. The reinforcement bracket includes an inboard edge, an outboard edge, and a central portion that extends between the inboard edge and the outboard edge of the reinforcement bracket in the vehicle lateral direction. The reinforcement bracket is shaped and arranged to change a load path when contacted by a 30 degree rigid barrier in accordance with Federal Motor Vehicle Safety Standards (FMVSS) 208, incorporated herein by reference, from a baseline load path provided by the bumper reinforcement beam alone without the reinforcement bracket to an inboard load path. An energy diverting bumper structure is connected to a front side of the central portion of the reinforcement bracket. The energy diverting bumper structure is shaped and arranged to change the inboard load path closer to the baseline load path when contacted by a 30 degree rigid barrier in accordance with FMVSS 208. These and other embodiments will be described in more detail below in reference to the appended drawings.

Figure 1:
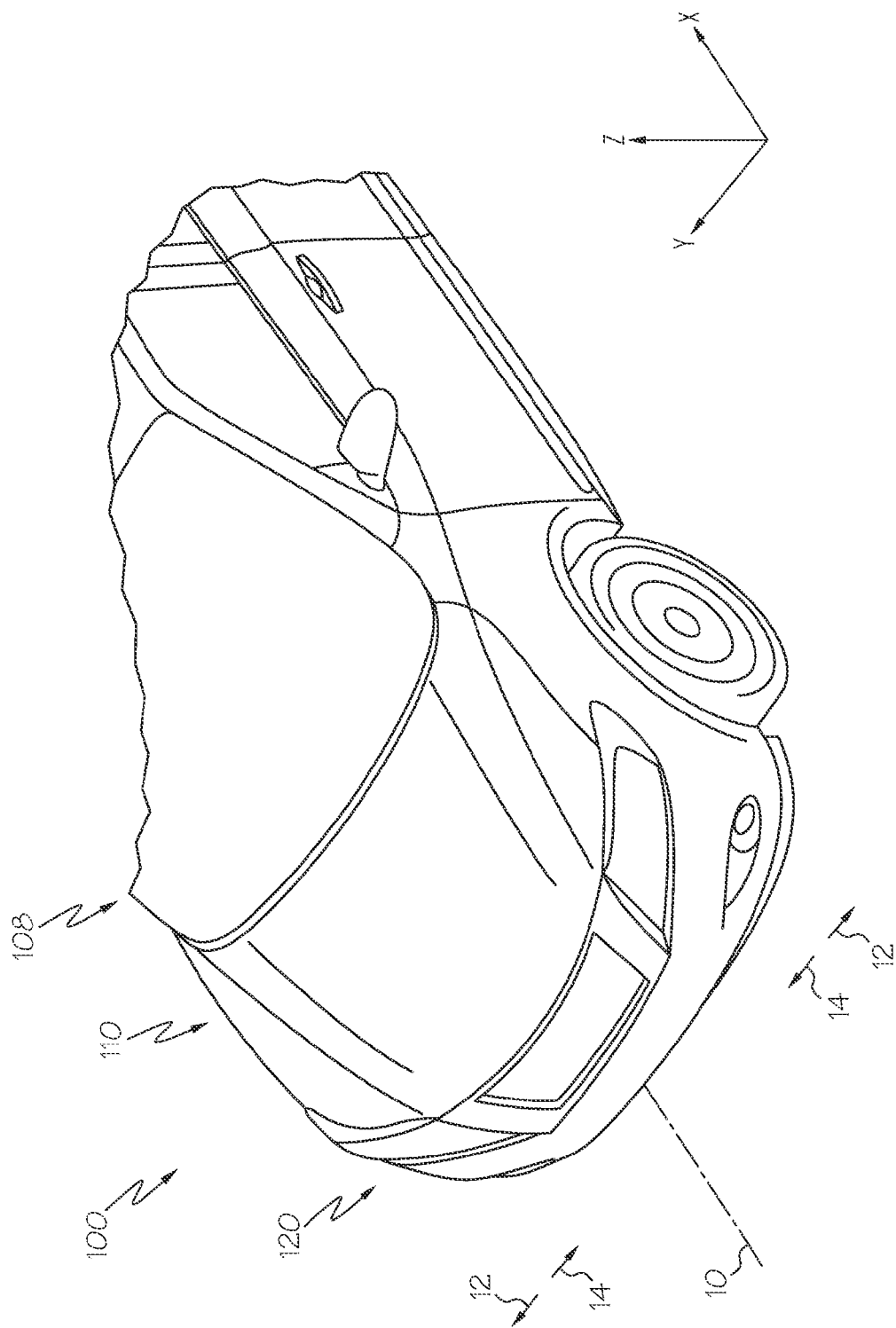
FIG. 1 schematically depicts a perspective view of a vehicle according to one or more embodiments shown or described herein.

As used herein, the term "vehicle longitudinal direction" refers to the forward-rearward direction of the vehicle (i.e., in the +/− vehicle X-direction depicted in FIG. 1). The term "vehicle lateral direction" refers to the cross-vehicle direction (i.e., in the +/− vehicle Y-direction depicted in FIG. 1), and is transverse to the vehicle longitudinal direction. The term "vehicle vertical direction" refers to the upward-downward direction of the vehicle (i.e., in the +/− vehicle Z-direction depicted in FIG. 1). Further, the terms "inboard" and "outboard" are used to describe the relative positioning of various components of the vehicle. Referring to FIG. 1, the term "outboard" as used herein refers to the relative location of a component in direction 12 with respect to a vehicle centerline 10. The term "inboard" as used herein refers to the relative location of a component in direction 14 with respect to the vehicle centerline 10. Because the vehicle structures may be generally symmetrical about the vehicle centerline 10, the direction to which use of terms "inboard" and "outboard" refer may be mirrored about the vehicle centerline 10 when evaluating components positioned along opposite sides of the vehicle 100.

Motor vehicles that incorporate elements according to the present disclosure may include a variety of construction methodologies that are conventionally known, including the unibody construction methodology depicted in FIG. 1 as well as a body-on-frame construction methodology. While the embodiments of the present disclosure are described and depicted herein in reference to unibody structures, it should be understood that vehicles that are constructed with body-on-frame construction may incorporate the elements that are shown and described herein.

Referring initially to FIG. 1, a vehicle 100 is depicted. The vehicle 100 includes a unibody 110 onto which a vehicle drivetrain is coupled. The vehicle 100 also includes a cabin 108 that is integral with the unibody 110. The cabin 108 generally defines a passenger cabin of the vehicle 100. The vehicle 100 includes a bumper 120 that is positioned at the front of the vehicle 100.

Figure 2:
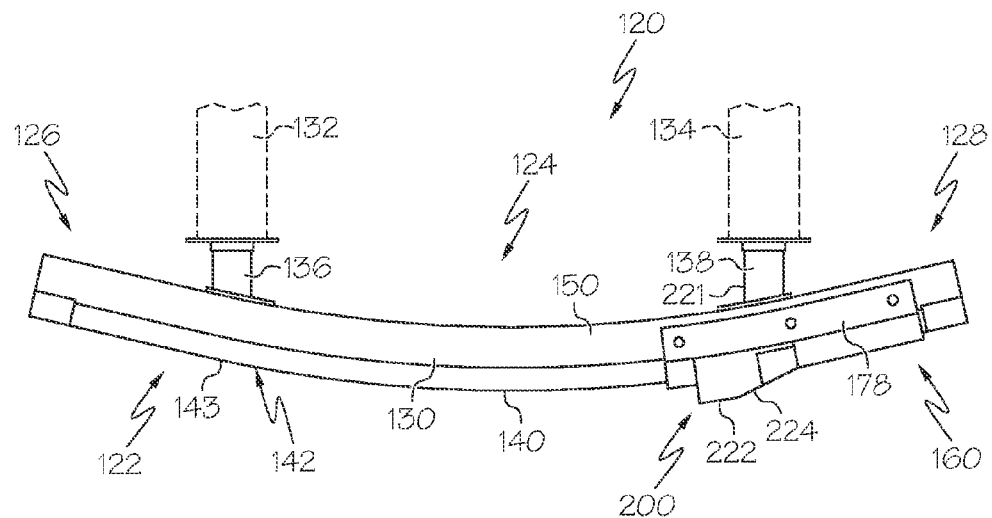
FIG. 2 depicts a top view of a bumper beam assembly including an energy diverting bumper structure according to one or more embodiments shown or described herein.

Referring to FIG. 2, the bumper 120 is depicted. The bumper 120 includes a bumper beam assembly 122, which may include a bumper reinforcement beam 130 having a bumper central portion 124 and bumper extension portions 126 and 128 that extend in the vehicle lateral directions from the central portion 124 beyond front side members 132 and 134. Crush boxes 136 and 138 may be provided between the front side members 132 and 134 and the bumper reinforcement beam 130.

The bumper reinforcement beam 130 and the bumper extension portions 126 and 128 extend in the vehicle lateral direction. The bumper reinforcement beam 130 may have a generally curved shape, as depicted in FIG. 2. More specifically, an inboard position 140 on a front side 142 of the bumper reinforcement beam 130 may be positioned forward of an outboard position 143 on the front side 142 of the bumper reinforcement beam 130 in the vehicle longitudinal direction, thereby giving the bumper reinforcement beam 130 a generally curved shape. In other embodiments, the bumper reinforcement beam 130 may have a generally straight shape extending in the vehicle lateral direction. The bumper reinforcement beam 130 may alternatively have any suitable shape that extends in the vehicle lateral direction.

The bumper extension portions 126 and 128 are positioned at outboard ends of the bumper reinforcement beam 130. The bumper extension portions 126 and 128 may refer to the portions of the bumper reinforcement beam outboard of the front side members 132 and 134. The bumper extension portions 126 and 128 may be formed as separate members that are coupled to the bumper central portion 124 to form the bumper reinforcement beam 130. Alternatively, the bumper extension portions 126 and 128 may be integrally formed with the bumper central portion 124 to form the bumper reinforcement beam 130. In embodiments where the bumper extension portions 126 and 128 are coupled to the bumper central portion 124, the bumper extension portions 126 and 128 may be coupled to the bumper central portion 124 through a variety of joining techniques, including, but not limited to, a welded attachment, a brazed attachment, mechanical fasteners, and/or structural adhesives.

Figure 3:
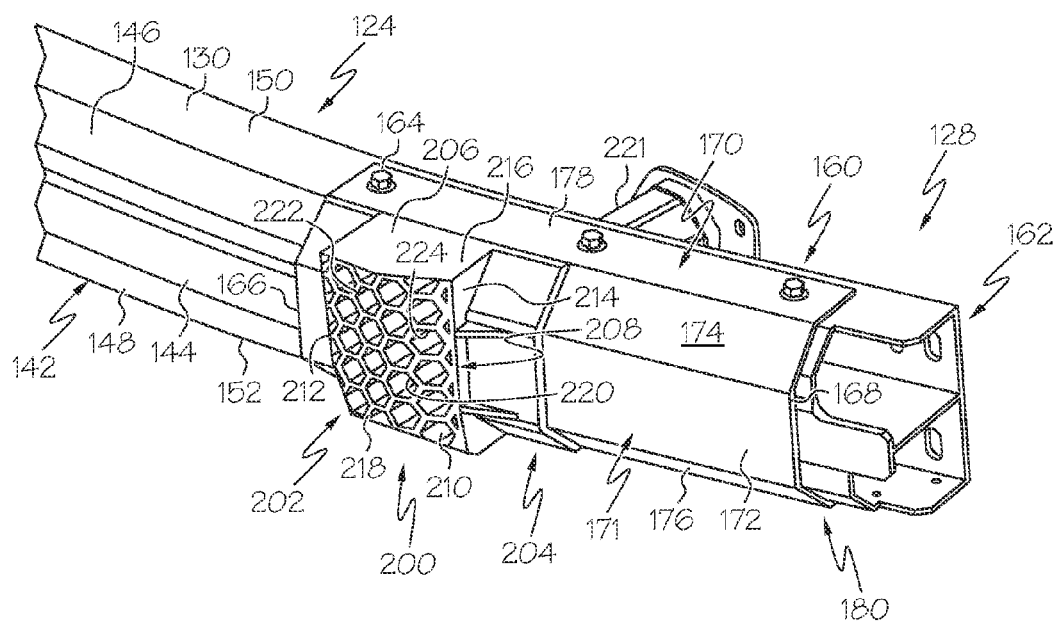
FIG. 3 depicts a perspective view of the bumper beam assembly and energy diverting bumper structure according to one or more embodiments shown or described herein.

Referring also to FIG. 3, the bumper reinforcement beam 130 including the bumper extension portions 126 and 128 include the front side 142 that is oriented to face forward in the vehicle longitudinal direction. The front side 142 of the bumper reinforcement beam 130 may have a generally front facing surface 144 that extends in the vehicle lateral direction. In the illustrated embodiment, the front side 142 of the bumper beam assembly 122 may include the front facing surface 144 and upper and lower surfaces 146 and 148 that extend in both vehicle vertical and longitudinal directions, rearwardly from the front facing surface 144 defining a somewhat C-shaped section of the bumper reinforcement beam 130. The front side 142 of the bumper reinforcement beam 130 may alternatively include any suitably shaped surface. The bumper reinforcement beam 130 further includes a top side 150 and a bottom side 152 that is positioned opposite the top side 150. The top side 150 and the bottom side 152 of the bumper reinforcement beam 130 may be oriented transverse to the front facing surface 144, extending rearwardly from the upper surface 146 and lower surface 148, respectively.

A reinforcement bracket 160 is coupled to the bumper reinforcement beam 130 at an outboard end 162 of the bumper reinforcement beam 130. While only one reinforcement bracket is illustrated for clarity, another reinforcement bracket may be provided at an opposite outboard end of the bumper reinforcement beam 130 in the same or similar manner as that described herein. The reinforcement bracket 160 may be formed from a variety of materials including, for example and without limitation, metals, composites, and the like, and may be formed by any suitable method or combination of methods such as stamping, forging, machining, and the like. The reinforcement bracket 160 is coupled about the front side 142 of the bumper reinforcement beam 130 at fastening locations 164 extending along the top and bottom sides 150 and 152 of the bumper reinforcement beam 130. In the depicted embodiment, the reinforcement bracket 160 is coupled over the bumper extension portion 128 and central portion 124 of the bumper reinforcement beam 130 such that the reinforcement bracket 160 spans between the central portion 124 and the bumper extension portion 128 and extends across the front side member 134.

The reinforcement bracket 160 includes an inboard edge 166 at the bumper central portion 124 and an outboard edge 168 at the bumper extension portion 128 that is positioned outboard from the inboard edge 166 in the vehicle lateral direction. The inboard edge 166 and the outboard edge 168 of the reinforcement bracket 160 may or may not be coupled directly to the front side 142 of the bumper reinforcement beam 130. The inboard edge 166 and the outboard edge 168 may be coupled to the front side 132 of the bumper beam assembly 122 through a variety of joining techniques, including, but not limited to, a welded attachment, a brazed attachment, mechanical fasteners, and/or structural adhesives. The reinforcement bracket 160 includes a central portion 170 that is positioned between the inboard edge 166 and the outboard edge 168 in the vehicle lateral direction.

The central portion 170 may have a contour that nests around the bumper reinforcement beam 130 and extends between the top side 150 and the bottom side 152 of the bumper reinforcement beam 130 in the vehicle vertical direction. The central portion 170 may generally have a front side 171 including a front facing surface 172 that extends in the vehicle lateral direction. The central portion 170 may further include upper and lower surfaces 174 and 176 that extend in both vehicle vertical and longitudinal directions, rearwardly from the front facing surface 172 defining a somewhat C-shaped section of the reinforcement bracket 160.

In the illustrated embodiment, top and bottom sides 178 and 180 of the central portion 170 extend across the top side 150 and the bottom side 152, respectively, of the bumper reinforcement beam 130 in the vehicle longitudinal direction, such that the reinforcement bracket 160 forms a sleeve over the bumper reinforcement beam 130. The central portion 170 may be coupled to the top side 150 and/or the bottom side 152 of the bumper reinforcement beam 130 at the fastening locations 164.

An energy diverting bumper structure 200 is coupled to the bumper reinforcement beam 130. While only one energy diverting bumper structure is illustrated for clarity, another energy diverting bumper structure may be provided at an opposite outboard end of the bumper reinforcement beam 130 in the same or similar manner as that described herein. The energy diverting bumper structure 200 may be formed from a variety of materials including, for example and without limitation, metals, composites, and the like, and may be formed by any suitable method or combination of methods such as molding, stamping, forging, machining, and the like. One suitable material is a blend of semi-crystalline polyester (polybutylene terephthalate, PBT, or polyethylene terephthalate, PET) and polycarbonate (PC), commercially available as XENOY. In some embodiments, the energy diverting bumper structure 200 is connected to the bumper reinforcement beam 130 between the inboard edge 166 and the outboard edge 168 of the reinforcement bracket 160. The energy diverting bumper structure 200 generally includes an energy diverting portion 202 and a connecting flange portion 204 extending laterally therefrom toward the outboard edge 168 of the reinforcement bracket 160. The energy diverting portion 202 may be located nearer to the inboard edge 166 of the reinforcement bracket 160 than the outboard edge 168 in the vehicle lateral direction. The energy diverting portion 202 is positioned forward of the reinforcement bracket 160 in the vehicle longitudinal direction, which will allow the energy diverting portion 202 to influence a load path during an impact, as will be described in greater detail below.

The energy diverting portion 202 includes a support body 206 that, in the illustrated embodiment, includes a honeycomb structure 208 having a plurality of support cells 210 (e.g., columnar and hexagonal) extending therethrough in the vehicle longitudinal direction. While other geometries for the support body may be used, the honeycomb structure can reduce the amount of material used for the support body 206, while providing suitable compressive stress resistance during an impact. The support body 206 includes an inboard side wall 212, an outboard side wall 214, a top side wall 216 and a bottom side wall 218. Extending between the walls 212, 214, 216 and 218 is a front impact surface 220. As can be seen, the outboard side wall 214 of the support body 206 may be located outboard of an inboard edge 221 of the crush box 138 (FIG. 2). In other embodiments, the outboard side wall 214 of the support body 206 may be located inboard of the inboard edge 221 of the crush box 138. The front impact surface 220 may have a first portion 222 defining a first plane that intersects the support cells 210 and a second portion 224 defining a second plane that intersects the support cells 210 (FIG. 2). The second plane may also intersect the first plane (or a plane parallel with the vehicle lateral direction) at an angle (e.g., of between about 5 degrees and about 45 degrees, such as between about 10 degrees and 40 degrees, such as between about 20 degrees and 35 degrees, such as about 30 degrees), thereby providing the second portion 224 with an angled orientation relative to the first portion 222 of the front impact surface 220 that angles rearwardly toward the outboard side wall 214 of the support body 206.

Figure 4:
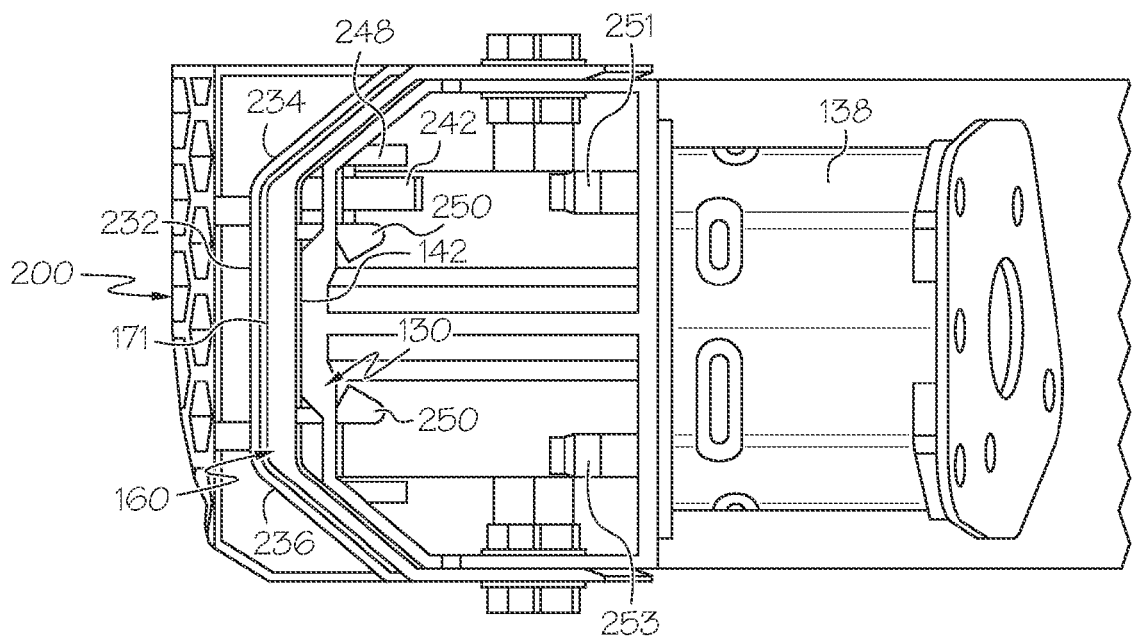
FIG. 4 depicts a section view of the bumper beam assembly and energy diverting bumper structure of FIG. 3 according to one or more embodiments shown or described herein.
Figure 5:
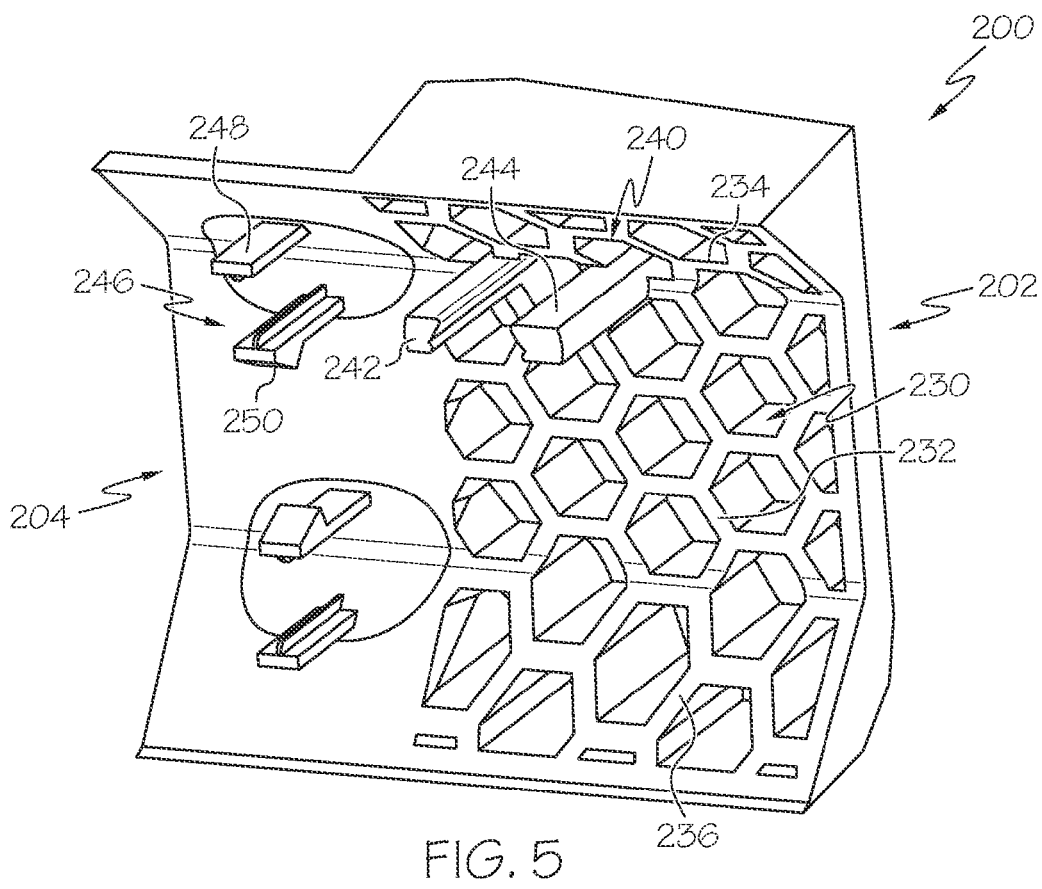
FIG. 5 depicts a rear view of the energy diverting bumper structure of FIG. 2 according to one or more of the embodiments shown or described herein.

Referring to FIGS. 4 and 5, the energy diverting bumper structure 200 is shaped to nest upon the front sides 171 and 142 of the reinforcement bracket 160 and the bumper reinforcement beam 130. The energy diverting bumper structure 200 includes a rear side 230 having a geometry that is different from the front impact surface 220 including a rear facing surface 232 that extends in the vehicle lateral direction and upper and lower surfaces 234 and 236 that extend in both vehicle vertical and longitudinal directions, rearwardly from the rear facing surface 232 defining a somewhat C-shaped rear side 230 of the energy diverting bumper structure 200 that corresponds to the C-shaped section geometries of the bumper reinforcement beam 130 and the reinforcement bracket 160.

Figure 6:
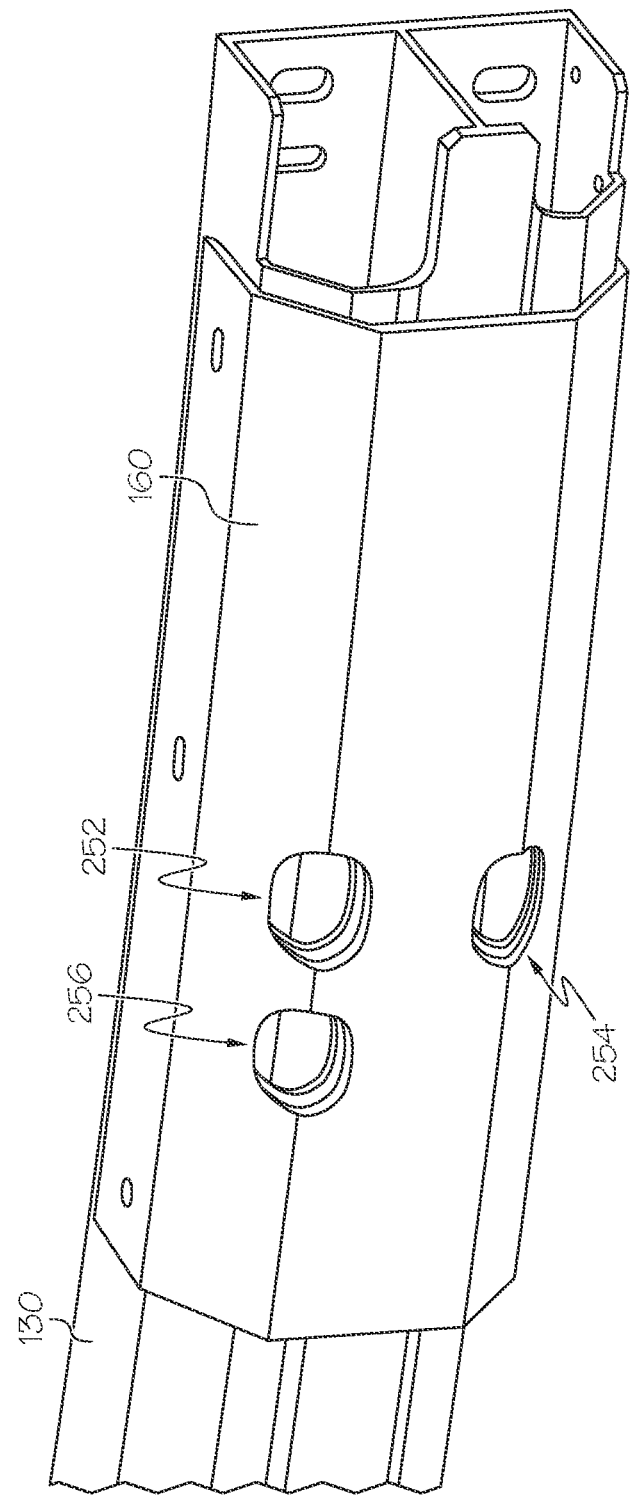
FIG. 6 depicts a front view of a bumper reinforcement beam of the bumper beam assembly of FIG. 2 with the energy diverting bumper structure removed.

The energy diverting portion 202 includes a fastening feature 240 in the form of laterally opposing clip arms 242 and 244. The connecting flange portion 204 includes fastening features 246, each having a pair of vertically opposing clip arms 248 and 250. The fastening features 240 and 246 are sized and arranged to be received within aligned service openings 252, 254 and 256 provided through the reinforcement bracket 160 and bumper reinforcement beam 130 (FIG. 6). As can be appreciated, the fastening features 240 and 246 and corresponding service openings 252, 254 and 256 can provide a snap attachment that constrains the energy diverting bumper structure 200 in each of the vehicle lateral, longitudinal and vertical directions. Further, use of the connecting flange portion 204 can position the energy diverting portion 202 further inboard, as will be described below. Fastening features 251 and 253 are also illustrated that connect the crash box 138 to the bumper reinforcement beam 130.

FIGS. 7A-9B illustrate operation of the energy diverting bumper structure 200 in changing a load path provided by the reinforcement bracket 160 closer to a baseline load path provided by the bumper reinforcement beam 130 alone. As used herein, the term "load path" refers to the direction in which a load will pass through connected members. In FIGS. 7-9, the load path is from an impact structure, particularly a 30 degree rigid barrier in accordance with FMVSS 208, and through the bumper beam assembly to the front side member.

Figure 8A:
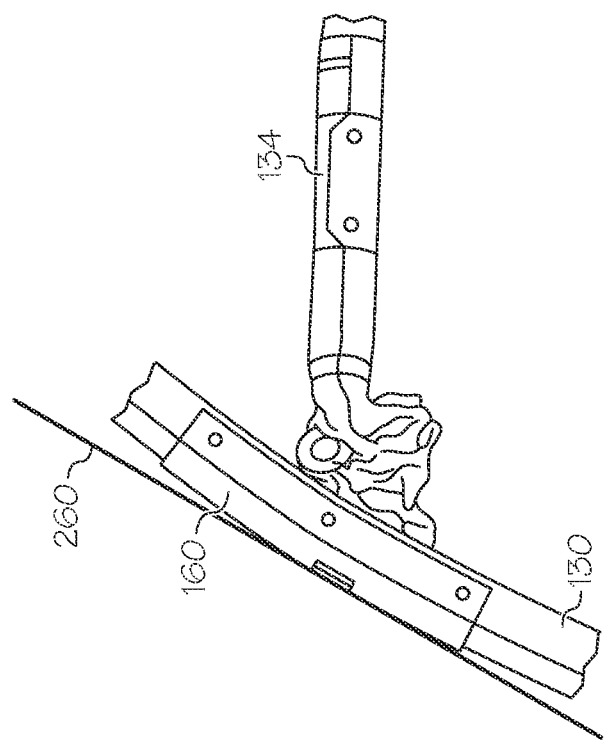
Figure 8B:
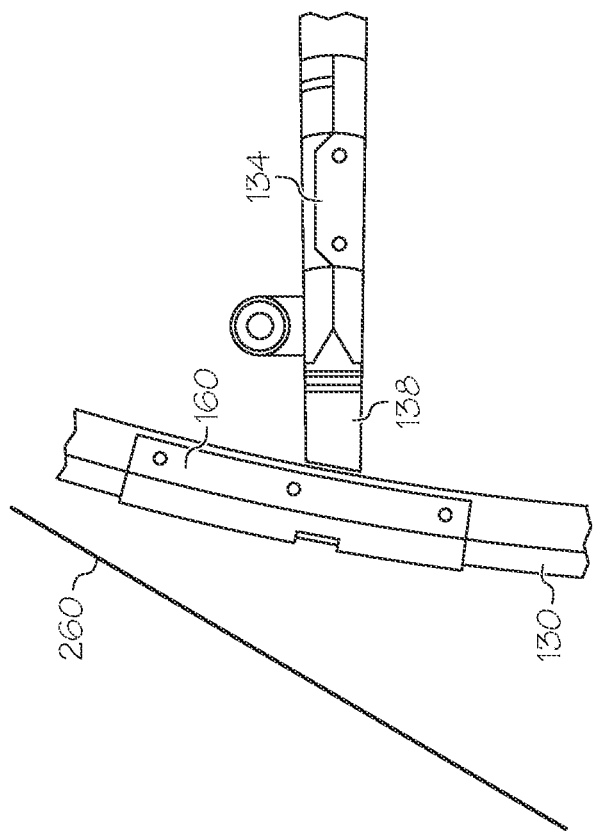

Referring first to FIGS. 7A and 7B, the bumper reinforcement beam 130 provides a baseline load path when contacted by a 30 degree rigid barrier 260 in accordance with FMVSS 208 that is offset inboard of the side member 134. Such an offset arrangement inboard of the side member 134 can provide the illustrated S-shaped deformation mode for the side member 134 and crush box 138. Referring to FIGS. 8A and 8B, the reinforcement bracket 160 is added to meet a small overlap impact test. A vehicle involved in a small front bumper overlap impact test may have only a portion of the front bumper reinforcement beam contact a barrier, for example less than about 25% of the width of the front bumper reinforcement beam. In such small front bumper overlap collisions, some of the energy dissipation elements of the vehicle may not be initiated or may be partially initiated. For example, energy dissipation elements that are positioned along the opposite side of the vehicle from the location of the barrier impact may not be initiated or may be partially initiated. Instead, in small front bumper overlap impact tests, the energy that is introduced to the vehicle structures may be non-symmetrical across the vehicle width. Accordingly, the response of the vehicle structures to the energy introduced by the small overlap impacts may introduce a non-symmetrical response to the vehicle structures. Referring to embodiments disclosed herein that are incorporated into vehicles that have a unibody construction, the structural members of the unibody, for example, may be non-symmetrically loaded when the vehicle is involved in a small front bumper overlap impact test.

While the reinforcement bracket 160 may be effective in a small front bumper overlap impact test, the reinforcement bracket 160 moves the load path from the baseline load path offset inboard of the side member 134 further outboard and more in alignment with the side member 134. Such an arrangement aligned with the side member 134 changes the deformation mode to more of a linear deformation of the side member 134 and crush box 138, which can increase deceleration of the vehicle during an impact. Referring now to FIGS. 9A and 9B, addition of the energy diverting bumper structure 200 moves the load path inboard of the side member 134, closer to the baseline load path. This is due at least in part to the shape of the second portion 224 of the front impact surface 220 and the location of the support body 206 inboard of a longitudinal axis of the side member 134.

It should now be understood that bumpers according to the present disclosure may include a bumper beam assembly including a reinforcement bracket coupled to a front side of the bumper beam assembly. Because the reinforcement bracket changes the load path from a baseline load path inboard of the side member, an energy diverting bumper structure is provided that is connected to the reinforcement bracket and the bumper reinforcement beam. The energy diverting bumper structure is shaped and located to change the load path closer to the baseline load path to a location inboard of the side member to provide a preferred deformation mode for the side member.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A bumper comprising:
   a bumper beam assembly comprising a bumper reinforcement beam;
   a reinforcement bracket positioned on a front side of the bumper beam assembly at an outboard end of the bumper beam assembly; and
   an energy diverting bumper structure positioned on a front side of the reinforcement bracket, the energy diverting bumper structure includes a support body of an energy diverting portion comprising an inboard side wall, an outboard side wall, a top side wall and a bottom side wall, where a front impact surface extends between the inboard side wall, the outboard side wall, the top side wall and the bottom side wall, the support body being located nearer an inboard edge of the reinforcement bracket than an outboard edge of the reinforcement bracket;
   wherein the outboard side wall of the support body is located nearer an inboard edge of the reinforcement bracket than an outboard edge of the reinforcement bracket.

2. The bumper of claim 1, wherein the front impact surface is arranged and configured to move a load path during a 30 degree rigid barrier inboard of a side member connected to the bumper reinforcement beam.

3. The bumper of claim 2, wherein the front impact surface of the energy diverting bumper structure includes a first portion defining a first plane and a second portion defining a second plane that intersects the first plane.

4. The bumper of claim 3, wherein the second portion of the front impact surface slopes rearwardly in the vehicle longitudinal direction toward the outboard side wall.

5. The bumper of claim 1, wherein the support body has a plurality of support cells extending therethrough.

6. The bumper of claim 1, wherein the energy diverting bumper structure is shaped to nest with the front side of the reinforcement bracket.

7. A vehicle comprising:
   a side support that extends in a vehicle longitudinal direction;
   a bumper beam assembly comprising a bumper reinforcement beam that is coupled to the side support, wherein the bumper reinforcement beam extends in a vehicle lateral direction that is transverse to the vehicle longitudinal direction, and wherein the bumper reinforcement beam comprises a front side that is oriented to face forward in the vehicle longitudinal direction;
   a reinforcement bracket positioned on a front side of the bumper beam assembly at an outboard end of the bumper reinforcement beam; and
   an energy diverting bumper structure positioned on a front side of the reinforcement bracket, the energy diverting bumper structure includes a support body of an energy diverting portion comprising an inboard side wall, an outboard side wall, a top side wall and a bottom side wall, where a front impact surface extends between the inboard side wall, the outboard side wall, the top side wall and the bottom side wall, the support body being located nearer an inboard edge of the reinforcement bracket than an outboard edge of the reinforcement bracket;
   wherein the outboard side wall of the support body is located nearer the inboard edge of the reinforcement bracket than the outboard edge of the reinforcement bracket.

8. The vehicle of claim 7, wherein the reinforcement bracket has the inboard edge that is located inboard of the side support and the outboard edge that is located outboard of the side support.

9. The vehicle of claim 8, wherein the energy diverting bumper structure is located between the inboard edge and outboard edge of the reinforcement bracket.

10. The vehicle of claim 9, wherein the energy diverting bumper structure is at least partially located inboard of the side member.

11. The vehicle of claim 7, wherein the outboard side wall of the support body is located outboard of an inboard edge of the side support.

12. The vehicle of claim 7, wherein the front impact surface is arranged and configured to move a load path during a 30 degree rigid barrier test inboard of a side member connected to the bumper reinforcement beam.

13. The vehicle of claim 12, wherein the front impact surface of the energy diverting bumper structure includes a first portion defining a first plane and a second portion defining a second plane that intersects the first plane.

14. The vehicle of claim 13, wherein the second portion of the front impact surface slopes rearwardly in the vehicle longitudinal direction toward the outboard side wall.

15. The vehicle of claim 7, wherein the support body has a plurality of support cells extending therethrough.

16. The vehicle of claim 7, wherein the energy diverting bumper structure is shaped to nest with the front side of the reinforcement bracket.

17. A method of altering a vehicle load path for a 30 degree rigid barrier test, the method comprising:
providing a bumper reinforcement beam connected to a side support that extends in a vehicle longitudinal direction, the bumper reinforcement beam providing a baseline load path for the 30 degree rigid barrier test;
connecting a reinforcement bracket to a front side of the bumper reinforcement beam at an outboard end of the bumper reinforcement beam, the reinforcement bracket moving the load path outboard of the baseline load path; and
connecting an energy diverting bumper structure to the bumper reinforcement beam thereby moving the load path provided by the reinforcement bracket inboard toward the baseline load path, the energy diverting bumper structure includes a support body of an energy diverting portion comprising an inboard side wall, an outboard side wall, a top side wall and a bottom side wall, where a front impact surface extends between the inboard side wall, the outboard side wall, the top side wall and the bottom side wall, the support body being located nearer an inboard edge of the reinforcement bracket than an outboard edge of the reinforcement bracket;
wherein the outboard side wall of the support body is located nearer the inboard edge of the reinforcement bracket than the outboard edge of the reinforcement bracket.

18. The method of claim 17 comprising locating an inboard edge of the reinforcement bracket inboard of the side support and locating an outboard edge of the reinforcement bracket outboard of the side support.

19. The method of claim 18 comprising locating the energy diverting bumper structure between the inboard edge and outboard edge of the reinforcement bracket.

20. The method of claim 19 comprising at least partially locating the energy diverting bumper structure inboard of the side member.

* * * * *